W. F. MORSE.
CORNER STAYING MACHINE.
APPLICATION FILED APR. 22, 1904.

937,840.

Patented Oct. 26, 1909.
6 SHEETS—SHEET 1.

Fig. 1.

WITNESSES:
Chas. J. Foner.
Chas. Young.

INVENTOR
William F. Morse
BY
Hey & Parsons
ATTORNEYS

W. F. MORSE.
CORNER STAYING MACHINE.
APPLICATION FILED APR. 22, 1904.

937,840.

Patented Oct. 26, 1909.
6 SHEETS—SHEET 3.

W. F. MORSE.
CORNER STAYING MACHINE.
APPLICATION FILED APR. 22, 1904.

937,840.

Patented Oct. 26, 1909.
6 SHEETS—SHEET 4.

WITNESSES:
Chas. J. Foner.
Chas. Young.

INVENTOR
William F. Morse
BY
Hey & Parsons
ATTORNEYS

W. F. MORSE.
CORNER STAYING MACHINE.
APPLICATION FILED APR. 22, 1904.

987,840.

Patented Oct. 26, 1909.
6 SHEETS—SHEET 6.

WITNESSES:
Chas. J. Foner.
Chas. Young.

INVENTOR
William F. Morse
BY
Hey Parsons
ATTORNEYS

The preferable embodiment of this invention comprises a pair of supports 1 2 for opposite corners to be stayed, engaging parts 3 4, one for each support, means for supplying adhesive pieces or stays to the corners, and means for effecting the coöperation of said supports and engaging parts to affix the stays. During the operation of the illustrated construction of the machine, the supports 1 2 are stationary, and each engaging part coöperates successively with a plurality of engaging faces of the corresponding support for attaching a stay. Although a pair of supports 1 2 are preferably used, it will be obvious to those skilled in the art that one of said supports and the corresponding engaging part may be dispensed with, if desired.

UNITED STATES PATENT OFFICE.

WILLIAM F. MORSE, OF ROCHESTER, NEW YORK, ASSIGNOR TO SAMUEL R. PARRY, OF ROCHESTER, NEW YORK.

CORNER-STAYING MACHINE.

937,840.     Specification of Letters Patent.     Patented Oct. 26, 1909.

Application filed April 22, 1904. Serial No. 204,422.

*To all whom it may concern:*

Be it known that I, WILLIAM F. MORSE, of Rochester, in the county of Monroe and State of New York, have invented a certain new and useful Corner-Staying Machine, of which the following is a specification.

This invention has for its object the production of a corner-staying machine, which is particularly simple in construction and efficient in operation; and to this end, it consists in the combinations, constructions and arrangements of the component parts of a corner-staying machine, as hereinafter fully set forth and pointed out in the claims.

In describing this invention, reference is had to the accompanying drawings, in which like characters designate corresponding parts in all the views.

Figure 1:
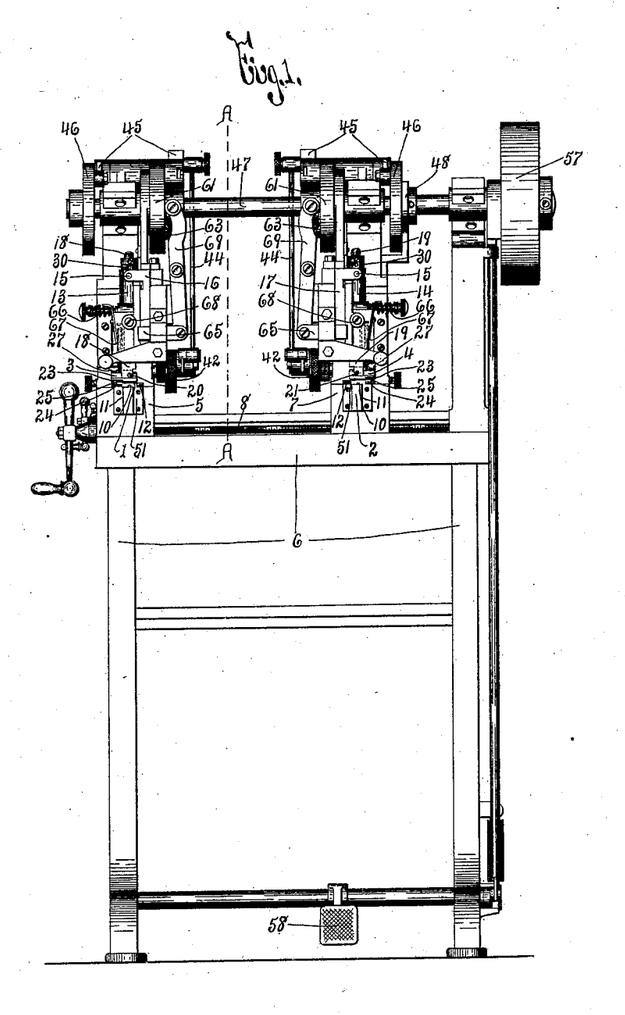
Figures 1 and 2 are, respectively, front and side elevations of a preferable embodiment of this invention.
Figure 2:
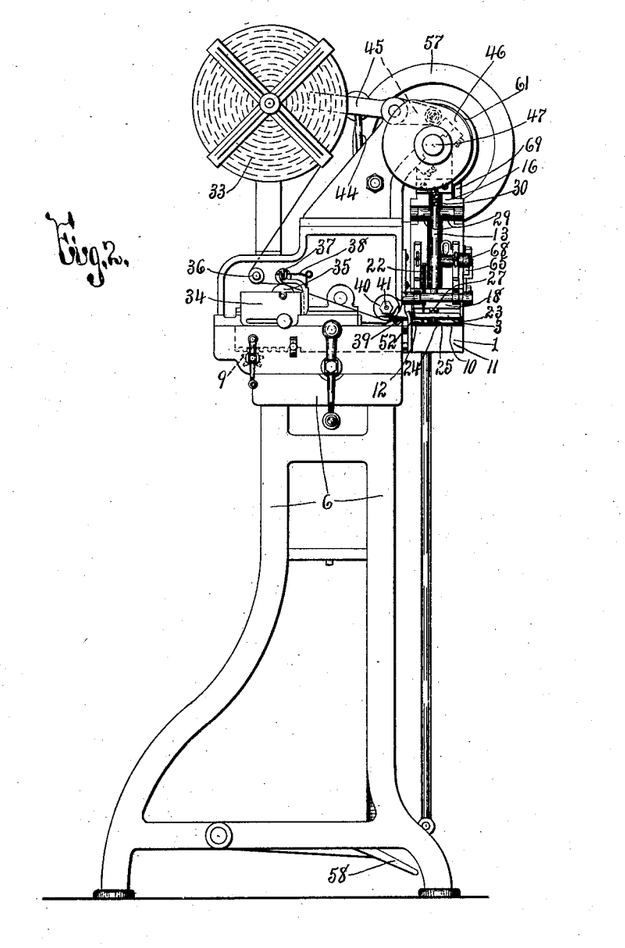
Figure 3:
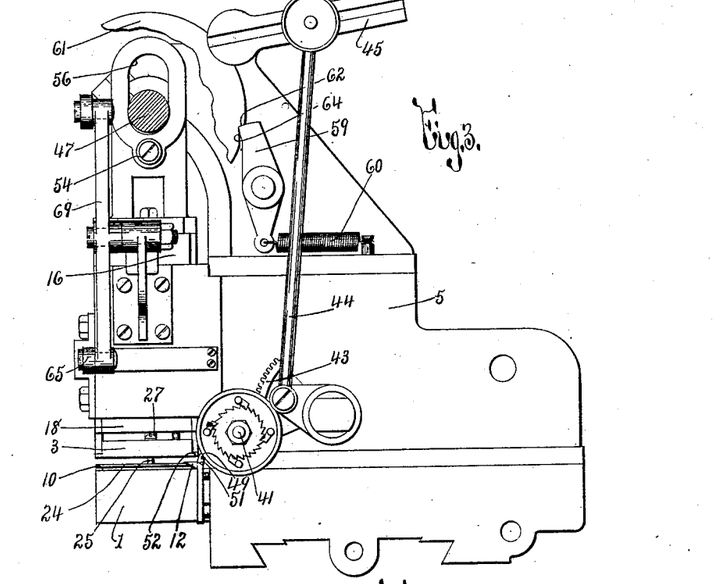
Fig. 3 is an enlarged sectional view, partly broken away, taken on line A—A, Fig. 1.

As shown in Figs. 1 and 2, the supports 1 2 project beyond the front faces of an upright 5 fixed to a suitable frame 6, and of a carriage 7 movable crosswise in the frame 6 toward and from the upright 5 by any desirable means, as a feed-screw 8. Said supports are generally movable lengthwise, or forwardly, by any suitable means, as gear-wheels 9 indicated by dotted lines, Fig. 2, for varying the amount of projection of the supports beyond the front faces of the upright 5 and the carriage 7 in conformity with the depth of the article, as a box, to be provided with stays, it being understood that the contiguous edges of sides of the box ordinarily engage the front faces of said upright and carriage. These supports 1 2 are usually of rectangular cross-section and are provided with engaging faces 10 at their tops arranged in substantially the same horizontal plane, and with additional engaging faces 11 at their outer sides disposed in substantially vertical planes. In order to facilitate the arrangement upon the supports 1 2 of the article to be stayed, the front faces of the upright 5 and the carriage 7 are provided with forwardly-projecting arms 12 having their lower faces inclined downwardly from their free ends toward a horizontal plane coincident with the faces 10 of said supports.

Figure 6:
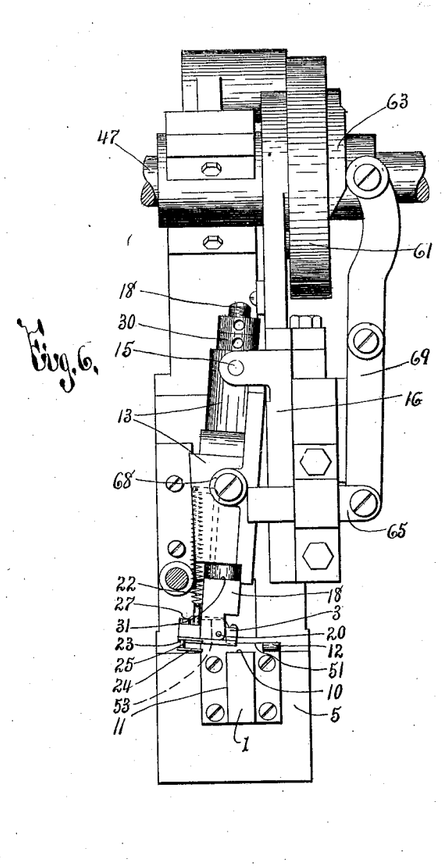
Figs. 6 and 7 are front elevations of one of the supports for the article to be stayed, the engaging part coöperating therewith, and contiguous portions of the machine.
Figure 7:
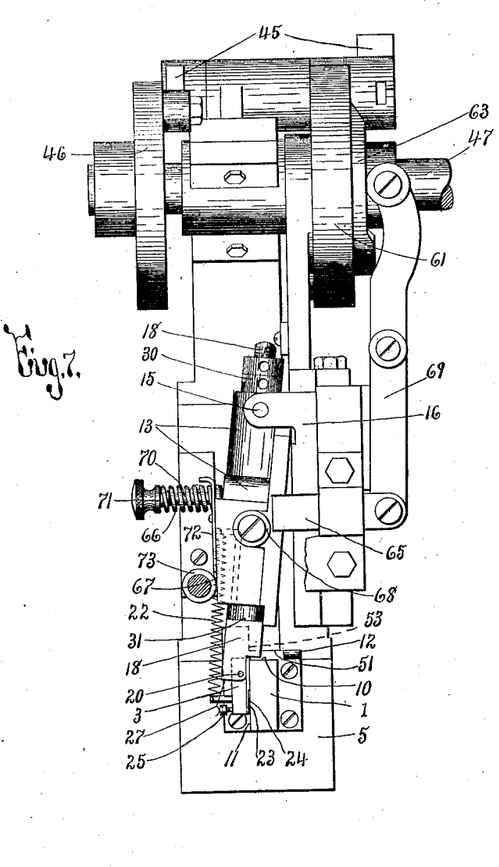
Figure 8:
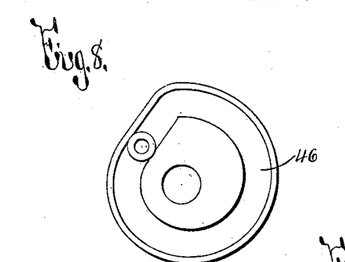
Fig. 8 is a face view of one of the cams for controlling the feed of the strips from which the stays are cut.
Figure 9:
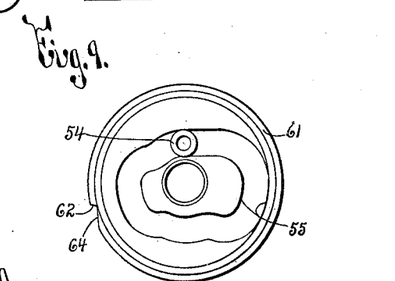
Figs. 9 and 10 are face views of the cams for raising and lowering one of the engaging parts, and for moving the same laterally.
Figure 10:
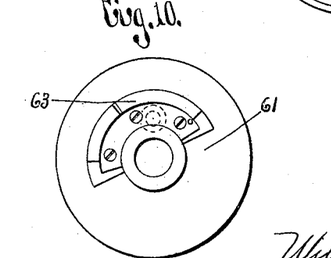

As best seen in Fig. 1, the engaging parts 3 4 are normally arranged with their lower faces in substantially horizontal planes opposed to the faces 10 of the supports 1 2 and extending beyond the inner and outer sides of vertical planes forming continuations of the faces 11 of said supports, and are preferably supported by the lower ends of plungers comprising main bodies 13 14, Figs. 6 and 7, pivoted at their upper ends at 15 to vertically-reciprocating heads 16 17, and members 18 19 reciprocally-movable relatively to the main bodies 13 14 and pivoted at their lower ends at 20 21 to said engaging parts, the pivots 20 21 being above and opposed to the faces 10 of the supports 1 2, and at the inner sides of vertical planes forming continuations of the faces 11, both when the engaging parts are in their normal position, as illustrated in Fig. 1, and when said parts are coöperating with the faces 10. Said engaging parts 3 4 are held in their normal position relatively to their supporting plungers by springs 22 having opposite ends connected, respectively, to the engaging parts 3 4 and the main bodies 13 14. The outer sides of the engaging parts 3 4 projecting laterally beyond vertical planes forming continuations of the faces 11, are provided with cutouts 23 in their lower or working faces and with stay-supports 24 which usually consist of flat strips movable into and out of the cutouts 23 and carried by arms 25 that are reciprocally-movable in bearings 26 provided on the engaging parts 3 4, and are formed with enlarged upper ends for engaging the top faces of the bearings 26 and limiting the downward movement of the stay-supports relatively to the engaging parts. Suitable springs 27 engaged with the enlarged ends of the arms 25 hold the stay-supports in their normal position with their upper faces beneath the working faces of the engaging parts 3 4, and yield freely to permit the stay-supports to enter the cutouts 23. In operation the lower or working face of each engaging part coöperates throughout its entire extent successively with the engaging faces of the support.

Figure 4:
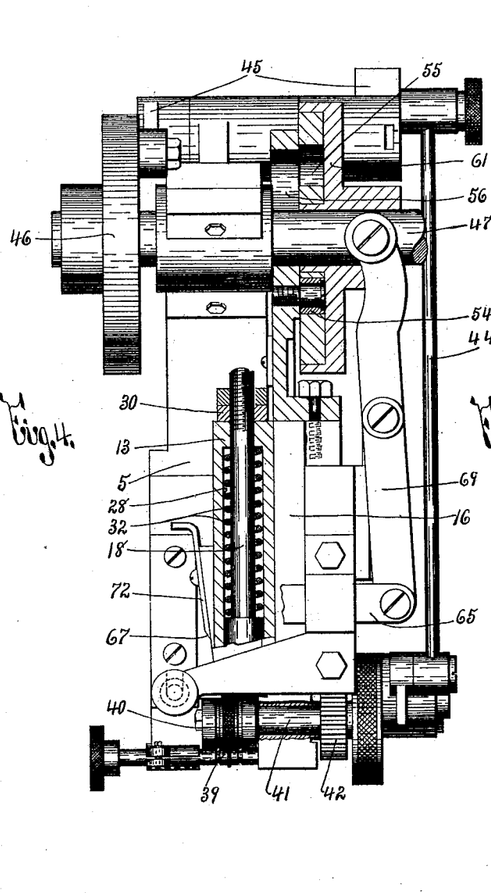
Figs. 4 and 5 are, respectively, front and side elevations, partly broken away and in section, of portions of the machine.
Figure 5:
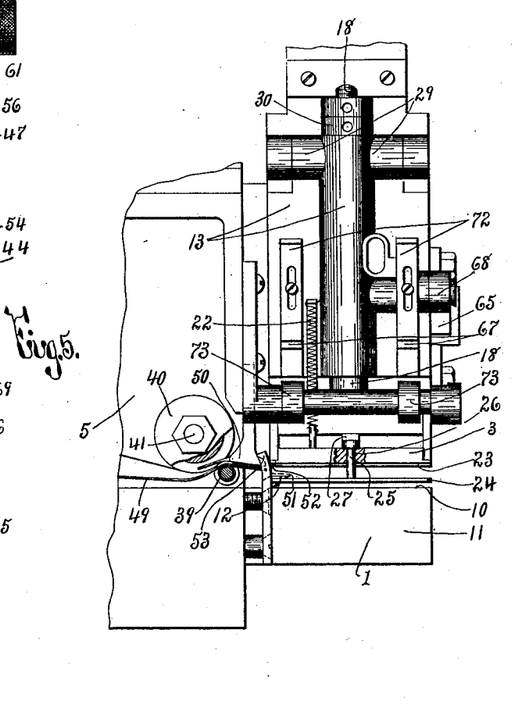

The main bodies 13 14 of the plungers supporting the engaging parts 3 4 are formed with upright openings 28, Fig. 4, and with laterally-extending branches 29, Fig. 5, at their upper ends forming supports for the pivots 15; and the members 18 19 extend lengthwise of the openings 28 and above and below the same, their upper ends being provided with adjustable shoulders 30 movable into and out of engagement with upper faces of the main bodies 13 14, and their lower ends being provided with the pivots 20 21 and with shoulders 31 movable into and out of engagement with lower faces of said main bodies. Springs 32 are arranged within the openings 28 around the members 18 19 between shoulders, provided, respectively, on the lower ends of said members 18 19 and within the upper ends of the openings 28, and operate to hold the members 18 19 in their normal position with their shoulders 30 engaged with upper faces of the main bodies 13 14 and their shoulders 31 separated from lower faces of said main bodies. The amount of separation of the shoulders 31 from the opposing lower faces of the main bodies 13 14 may be regulated by adjusting shoulders 30.

The means for supplying adhesive pieces or stays to the corners on the supports 1 2 consists of reels 33, moistening devices, feeding devices, and cutting means. Said reels 33 are of any desirable form, size and construction for receiving and supporting the adhesive strips. As illustrated, the moistening devices each consist of a fluid-containing reservoir 34 adjustable relatively to the frame 6 and suitably secured in position, a roller 35 movable in the reservoir 34 and engaging the lower face of the corresponding adhesive strip for applying a moistening fluid thereto, a guide-roller 36, a pressure-roller 37 engaging the upper face of the strip above the roller 35, and a spring arm 38 for forcing the roller 37 toward the roller 35. Each roller 35 is formed with a groove, not illustrated, in its periphery in order that the portion of the adhesive strip movable in alinement with this groove may be unprovided with the moistening fluid. Said rollers 35 thus moisten separated portions of the adhesive strips.

The feeding devices are of any desirable form, size and construction, are supported respectively by the upright 5 and the carriage 7, and are each here shown as comprising opposing rollers 39 40, the rollers 39 being adjustable toward and from the rollers 40 in any desirable manner, unnecessary to herein set forth, for varying the frictional force with which said rollers engage the adhesive strips, and the rollers 40 being fixed to corresponding ends of shafts 41 which are journaled respectively in the upright 5 and the carriage 7, and are each provided with a loose gear-wheel 42 connected thereto by any suitable ratchet-wheel mechanism, unnecessary to herein illustrate and describe, for intermittently advancing said shafts 41. Each of the gear-wheels 42 is actuated by a rocking part, as a toothed segment 43, connected to one end of a link 44, the other end of which is adjustable lengthwise of one end of a rocking lever 45 having its other end engaged by a cam 46 on the shaft 47. The cam 46 for actuating the feeding device supported by the carriage 7 is engaged by an arm 48 provided on said carriage, for moving this cam lengthwise of the shaft 47 with the carriage 7. It will be apparent, however, to those skilled in the art, that the means for actuating one of the gear-wheels 42 may be omitted and both gear-wheels 42 mounted on the same shaft 41, in which event this shaft will be elongated and the gear-wheel 42 supported by the carriage 7 will slide lengthwise of said shaft. The adhesive strips when fed beyond the rollers 39 40, are usually guided by lower and upper separated bars 49 50 which extend lengthwise of the path of movement of said strips, register with annular grooves in the rollers 39, 40, and terminate in close proximity to the stay-supports 24, the ends of the bars 49 adjacent the stay-supports 24 being unsupported and composed of spring material.

The cutting means for severing the adhesive strips into pieces or stays is here illustrated as knives 51 52, fixed, respectively, to the supports 1 2, and to the plungers supporting the engaging parts 3 4, and having their cutting edges arranged substantially parallel with the faces 10 of the supports 1 2. Said knives 52 are guided in their movement by arms 53 projecting above the faces 10 and extending rearwardly toward their upper edges. The cutting edges of the knives 51 are preferably arranged below the adjacent unsupported ends of the bars 49, and, consequently, the downward movement of the knives 52 slightly depresses said ends of the bars 49, which immediately spring upwardly after the operation of the knives 51 52, and thus elevate above the knives 51 the advance ends of the strips from which the stays are to be cut and prevent adhesion of said advance ends to the knives 51.

In the preferable construction of this invention, the means for effecting the coöperation of the supports 1 2 and the engaging parts 3 4 to affix the stays, consists of the plungers and heads previously described for supporting and reciprocating the engaging parts 3 4, means for actuating the heads, and means for moving laterally the free or lower ends of the plungers. Said means for actuating the heads 16 17 consists of cams 55 revoluble with the shaft 47 and engaging rollers 54 provided on detachable extensions of said heads formed with lengthwise slots 56 for receiving the shaft 47. During a complete revolution of the shaft 47 the cams 55 move the heads 16 17 downwardly to a plane intermediate of their upper and lower positions to non-slidably engage and compress the stay upon the side of the box resting on the horizontal face of the support; then slightly raise the heads, and finally depress said heads to the limit of their movement to cause the engaging part to slidably engage the stay upon the side of the face supported on the vertical face of the support and return the heads to their normal elevated position. The shaft 47 is normally stationary and is actuated to make intermittent revolutions by a constantly revolving pulley 57, Fig. 1, and any desirable clutch, not illustrated, interposed between said shaft and pulley and controlled by a treadle 58. Upon the completion of each revolution of the shaft 47 retrograde movement thereof is prevented by a pawl 59 pivoted to a suitable support between its ends and having one extremity connected to a spring 60, and its other extremity normally in contact with the periphery of a disk 61 and movable toward the axis of the disk into engagement with a shoulder 62 thereof extending inwardly from said periphery. Two of the disks 61 are fixed to the shaft 47, each being provided on one face with one of the cams 55, and on its other face with an additional cam 63, and the disk 61 coöperating with the pawl 59 is formed with an inclined surface 64 which extends outwardly from the inner end of the shoulder 62 to the periphery of said disk.

As best seen in Figs. 4, 5, 6 and 7, the means for moving laterally the free or lower ends of the plungers supporting the engaging parts 3 4 consists of plungers 65 for moving these ends of the plungers in one direction, and springs 66 and cams 67 for moving said ends in the reverse direction. The plungers 65 are supported by the upright 5 and the carriage 7, are reciprocally movable into and out of engagement with rollers 68 on the main bodies 13 14 in planes disposed at substantially right-angles with the downward path of movement of said main bodies, and are actuated by the cams 63 and levers 69 pivoted intermediate of their ends to suitable supports, and having their upper ends engaged with the cams 63, and their lower ends pivoted to the plungers 65. Said cams 63 are so constructed that just before the cams 67 operate to move the engaging parts 3 4 laterally, the plungers 65 are caused to commence their return movement from the rollers 68. The springs 66 are mounted on rods 70 extending through the main bodies 13 14 and having corresponding ends fixed to the heads 16 17, and are interposed between shoulders 71 on the free ends of said rods and opposing surfaces of the main bodies 13 14. The cams 67 are fixed to the main bodies 13 14, are preferably provided on the lower ends of parts 72 adjustable lengthwise of said main bodies and coöperate with rollers 73 fixed to the upright 5 and the carriage 7.

Figure 11:
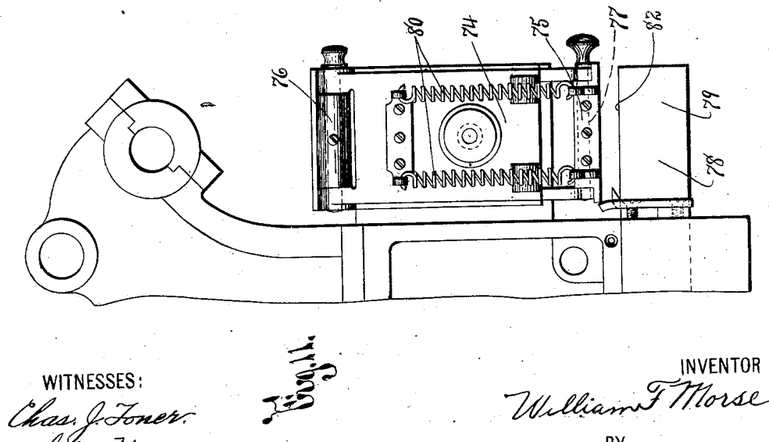
Figs. 11 and 12 are, respectively, side and front elevations of a portion of a modified construction of this machine.
Figure 12:
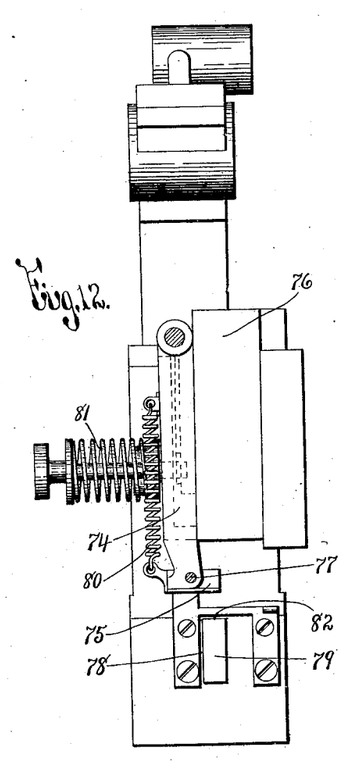
Figure 13:
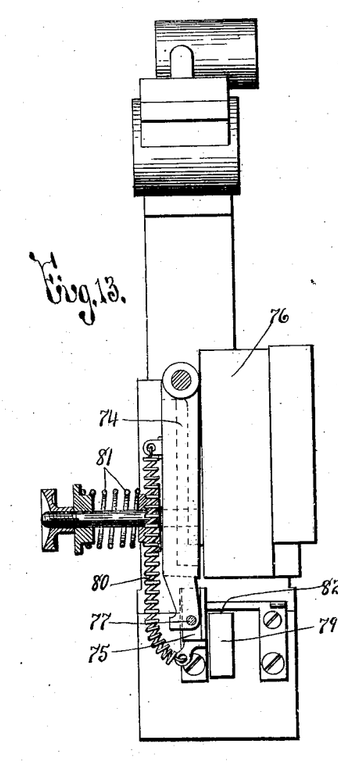
Fig. 13 is a side elevation of the means shown in Figs. 11 and 12, the engaging part being illustrated as coöperating with the side of the support.

In Figs. 11, 12 and 13 is illustrated a modified construction of a plunger 74 for the engaging part 75. The plunger 74 is pivoted at its upper end to the head 76 and is secured at its lower end to the engaging part 75 by a pivot 77 normally arranged at the outer side of a vertical plane forming a continuation of the outer face 78 of the support 79. Springs 80 hold the engaging part in its normal position relatively to the plunger 74, and an additional spring 81 of greater strength than the springs 80 tends to force the lower end of the plunger 74 laterally to its normal position. As the plunger 74 descends, the engaging part 75 coöperates with the upper face 82 of the support 79 and then automatically rocks on its pivot 77 for coöperating with the face 78 of said support.

The operation of the preferable construction of this invention is as follows: The carriage 7 is adjusted laterally into position, the supports 1 2 are moved lengthwise to project the requisite distance, and the article to be stayed is arranged upon the supports, whereupon the operator actuates the treadle 58 and the machine commences its operation. At the commencement of the rotation of the shaft 47, the advance ends of the adhesive strips are fed forward and engaged by the stay-supports 24, and immediately thereafter the heads 16 17 commence their downward movement and cause the knives 51 52 to sever the advance ends of the adhesive strips, and also cause the engaging parts 3 4 to coöperate with the faces 10 of the supports 1 2 to affix portions of the stays, the arrangement of the pivots 20 21 at the inner sides of planes forming continuations of the faces 11 of said supports preventing turning of the engaging parts on these pivots. After this coöperation of the parts 1 2, 3 4, the heads 16, 17 ascend a limited distance, thus relieving the stays from the pressure for attaching the same, and the lower ends of the main bodies are moved laterally by the plungers 65, whereupon said heads move downwardly, and the engaging parts 3 4 when next encountered with the article to be stayed rock automatically as a whole on their pivots and assume their position for coöperating with the faces 11 of the supports 1 2. During the additional downward movement of the heads 16 17, the plungers 65 are moved backwardly from engagement with the rollers 68, and the cams 67 coöperate with the rollers 73 for forcing the engaging parts 3 4 firmly toward the faces 11 to affix additional portions of the stays. After the heads 16 17 reach the limit of their downward movement the cams 55 effect the return of said heads to their elevated positions, the springs 66 move the lower ends of the main bodies 13 14 toward the heads 16 17 and the shaft 47 ceases its operation upon making a complete revolution.

To those skilled in the art it will be understood that this machine is simple in construction, and is particularly efficient in operation as it tends to cause the separable edges of the sides to be stayed, to become firmly pressed together and thus makes a particularly firm and desirable corner.

The construction and operation of this machine will now be readily understood upon reference to the foregoing description and the accompanying drawings and it will be apparent that the component parts thereof may be more or less varied without departing from the spirit of this invention.

Having thus fully described my invention, what I claim as new and desire to secure by Letters Patent, is:—

1. In a corner-staying machine, the combination of two members, one a support for the article having a corner to be stayed, said support having a plurality of engaging faces, and the other an engaging part having a single working face for coöperating successively with the engaging faces of the support for attaching a stay, said part operating to non-slidably engage the stay and compress the same when coöperating with one of said faces and to slidably engage the stay when coöperating with another of said faces, and means for actuating the relatively movable member, substantially as and for the purpose specified.

2. In a corner-staying machine, the combination of a fixed support for the article having a corner to be stayed, said support having a plurality of engaging faces, and an engaging part having a single working face for coöperating successively with the engaging faces of the support for attaching a stay, said part coöperating to non-slidably engage the stay and compress the same when coöperating with one of said faces and to slidably engage the stay when coöperating with another of said faces, and means for actuating the engaging part, substantially as and for the purpose set forth.

3. In a corner-staying machine, the combination of two members, one being movable relatively to the other and one comprising a support for the article having a corner to be stayed, said support having a plurality of engaging faces, and the other an engaging part having a single working face coöperating successively with the working faces of the support, the single working face coöperating throughout its entire extent with both working faces of the support, one of said members being movable as a whole from the other after the coöperation of said engaging part with one face of the support and before the coöperation of said engaging part with the other face of the support, and means for actuating the relatively movable member, substantially as and for the purpose described.

4. In a corner-staying machine, the combination of a support for the article having a corner to be stayed, said support having engaging faces, one being arranged in a substantially horizontal plane and another in a substantially vertical plane, and an engaging part having a working face normally arranged in a substantially horizontal plane, said engaging part being movable toward the substantially horizontal face of the support for coöperating therewith, and movable from said face and then in a substantially vertical plane to coöperate with the substantially vertical face of the support, and means for actuating the engaging part, substantially as and for the purpose described.

5. In a corner-staying machine, the combination of a movable plunger; with two members, one comprising a support for the article having a corner to be stayed, and the other an engaging part coöperating successively with the support for attaching the stay, one of said members being normally opposed to the other and connected to and movable with the plunger in a direction at substantially a right-angle to a face of said support, for compressing a stay, and being movable relatively to the plunger after the first coöperation of said members and before the second coöperation thereof, said engaging part slidably engaging the stay during the second coöperation of said members, and means for actuating the plunger, substantially as and for the purpose specified.

6. In a corner-staying machine, the combination of a movable plunger; with two members, one comprising a support for the article having a corner to be stayed, said support having a plurality of engaging faces, and the other an engaging part coöperating successively with the engaging faces of the support for attaching a stay, one of the members being normally opposed to the other and connected to and movable with the plunger in a direction at substantially a right-angle to one face of said support and being movable relatively to the plunger after the first coöperation of said members and before the second coöperation of said members, and means for reciprocating the plunger once for each coöperation of the engaging part with each face of the support, substantially as and for the purpose set forth.

7. In a corner-staying machine, the combination of a support for the article having a corner to be stayed, said support having a plurality of engaging faces, a plunger movable toward and from the support, an engaging part connected to the plunger and movable therewith and coöperating successively with the engaging faces of the support for attaching a stay, the engaging part being movable relatively to the plunger after the coöperation of said part with one engaging face of the support and before the coöperation thereof with another face of the support, means for forcing the engaging part toward the last-mentioned face of the support, and means for reciprocating the plunger once for each coöperation of the engaging part with each face of the support, substantially as and for the purpose specified.

8. In a corner-staying machine, the combination of a support for the article having a corner to be stayed, said support having a plurality of engaging faces, a plunger movable toward and from the support, an engaging part connected to the plunger and movable therewith and coöperating successively with the engaging faces of the support for attaching a stay, the engaging part being movable relatively to the plunger after the coöperation of said part with one engaging face of the support and before the coöperation thereof with another face of the support, and means for reciprocating the plunger once for each coöperation of the engaging part with each face of the support, substantially as and for the purpose set forth.

9. In a corner-staying machine, the combination of a support for the article having a corner to be stayed, said support having a plurality of engaging faces, a reciprocally movable plunger movable toward and from the support, an engaging part pivoted to the plunger and movable reciprocally therewith, and coöperating successively with the engaging faces of the support for attaching a stay, the engaging part being movable on its pivot after the coöperation of said part with one engaging face of the support and before the coöperation thereof with another face of said support, and means for reciprocating the plunger once for each coöperation of the engaging part and each face of the support, substantially as and for the purpose described.

10. In a corner-staying machine, the combination of a support having a plurality of engaging faces, a reciprocally movable plunger movable toward and from the support, an engaging part pivoted to the plunger and movable reciprocally therewith, and coöperating successively with the engaging faces of the support for attaching the stay, the pivot of the engaging part being opposed to one of the engaging faces of the support when said part is coöperating with said engaging face, and the engaging part being movable laterally to carry its pivot to one side of said engaging face for permitting said part to move on its pivot and coöperate with the second engaging face of the support, and means for actuating the plunger, substantially as and for the purpose specified.

11. In a corner-staying machine, the combination of a support having a plurality of engaging faces, a reciprocally movable plunger movable toward and from the support, an engaging part pivoted to the plunger and movable reciprocally therewith, and coöperating successively with the engaging faces of the support for attaching a stay, the pivot of the engaging part being opposed to one face of the support when coöperating therewith, and said engaging part being movable laterally to carry its pivot to one side of said engaging face for permitting said part to move on its pivot to coöperate with the second engaging face of the support, means for actuating the plunger, and means for moving the engaging part laterally, substantially as and for the purpose set forth.

12. In a corner-staying machine, a support for the article having a corner to be stayed, said support having engaging faces, one being arranged in a substantially horizontal plane and another in a substantially vertical plane, a plunger movable toward and from the substantially horizontal face of the support, and an engaging part pivoted to the plunger and having a working face normally arranged in a substantially horizontal plane, said part being movable with the plunger for coöperating with the substantially horizontal engaging face of the support, and being movable on its pivot relatively to the plunger and then with the plunger for coöperating with the substantially vertical face of the support, substantially as and for the purpose described.

13. In a corner-staying machine, the combination of two members, one comprising a support having a plurality of engaging faces, and the other an engaging part coöperating successively with the support, one of the members being pivoted and movable on its pivot relatively to the other after the first coöperation of said members and before the second coöperation thereof, the axis of said pivoted member being opposed to the other member during the first coöperation of said members for preventing turning of the pivoted member, and the pivoted member being movable laterally for arranging its axis at one side of the other member previously to the second coöperation of said members, and means for forcing the movable member toward and from the other, substantially as and for the purpose specified.

14. In a corner-staying machine, a support having a plurality of engaging faces, a plunger movable toward and from the support, an engaging part pivoted to the plunger and coöperating successively with the engaging faces of said support, said engaging part, when coöperating with one of the faces of the support, being arranged with its axis opposed to said face and being movable laterally for arranging its axis at one side of the support, and means for forcing the engaging part toward the second face of the support, said means being operative independently of the movement of the plunger, substantially as and for the purpose set forth.

15. The combination of a support having a plurality of engaging faces, means movable toward and from the support, a plunger pivoted to said means, an engaging part pivoted to the plunger and coöperating successively with a plurality of engaging faces of the support, means for forcing the plunger laterally after the coöperation of the engaging part with one of said faces of the support, and means for forcing the engaging part toward another face of the support, and means for relieving the plunger from the action of said means for forcing the plunger laterally, substantially as and for the purpose described.

16. In a corner-staying machine, the combination of a support having a plurality of engaging faces, means movable toward and from the support, and an engaging part connected to and movable with said means for coöperating with an engaging face of the support, and movable as a whole laterally relatively to said means into position to coöperate with another face of the support, means for actuating the first-mentioned means and for moving the engaging part as a whole relatively to the first-mentioned means, substantially as and for the purpose specified.

17. In a corner-staying machine, the combination of a support, a reciprocating head movable toward and from the support, a plunger connected to said head and movable therewith, the plunger comprising a main body pivoted to the head, a member movable relatively to the main body, and a spring interposed between the main body and said member, said main body and said member being also provided with shoulders normally spaced apart and engaging each other when the spring is compressed, an engaging part pivoted to said member and coöperating successively with the engaging faces of the support, the engaging part coöperating with one face of the support to non-slidably engage the stay and compress the same, and to slidably engage the stay when coöperating with another face of the support, and the plunger being movable laterally after the first and before the second coöperation of the engaging part and the support, and means for actuating the head, substantially as and for the purpose set forth.

18. In a corner-staying machine, the combination of a support having a plurality of engaging faces, a reciprocating head movable toward and from the support, a plunger pivoted to the head, an engaging part pivoted to the plunger and coöperating successively with the engaging faces of the support for attaching a stay, the pivot of the engaging part being opposed to one of the engaging faces of the support when said part is coöperating with said engaging face, and the plunger being movable laterally and thereby carrying the engaging part to bring its pivot to one side of said engaging face for permitting said part to move on its pivot for coöperating with the second engaging face of the support, and means for actuating the head, substantially as and for the purpose described.

19. The combination of clamping means for attaching a stay, said means comprising two members, one being fixed and the other movable, with opposing knives carried respectively by said members, one of said knives being provided with an arm projecting toward its cutting edge and inclined from said edge for engaging and guiding the movable knife, substantially as and for the purpose specified.

In testimony whereof, I have hereunto signed my name in the presence of two attesting witnesses, at Rochester, in the county of Monroe, in the State of New York, this 7th day of January, 1904.

WILLIAM F. MORSE.

Witnesses:
   Roy C. Webster,
   Chas. J. Toner.